US008612786B1

(12) United States Patent
Lachwani et al.

(10) Patent No.: US 8,612,786 B1
(45) Date of Patent: Dec. 17, 2013

(54) DEEP IDLE MODE

(75) Inventors: Manish Lachwani, Sunnyvale, CA (US); David Berbessou, Sunnyvale, CA (US)

(73) Assignee: Amazon Technologies, Inc., Reno, NV (US)

( * ) Notice: Subject to any disclaimer, the term of this patent is extended or adjusted under 35 U.S.C. 154(b) by 368 days.

(21) Appl. No.: 12/890,003

(22) Filed: Sep. 24, 2010

(51) Int. Cl.
*G06F 1/00* (2006.01)
*G06F 1/04* (2006.01)
*G06F 1/12* (2006.01)
*G06F 5/06* (2006.01)

(52) U.S. Cl.
USPC .......................... 713/322; 713/600; 713/601

(58) Field of Classification Search
USPC .......... 713/300, 320, 322, 323, 324, 600, 601
See application file for complete search history.

(56) References Cited

U.S. PATENT DOCUMENTS

| | | | | |
|---|---|---|---|---|
| 5,189,647 A * | 2/1993 | Suzuki et al. | ................... | 368/10 |
| 5,388,265 A | 2/1995 | Volk | | |
| 5,815,693 A * | 9/1998 | McDermott et al. | .......... | 713/501 |
| 5,955,959 A * | 9/1999 | Taki et al. | ....................... | 340/3.2 |
| 6,163,583 A * | 12/2000 | Lin et al. | ....................... | 375/354 |
| 6,715,091 B1 * | 3/2004 | Kundu | .......................... | 713/323 |
| 7,042,263 B1 * | 5/2006 | Johnson et al. | ................ | 327/199 |
| 7,120,911 B1 * | 10/2006 | Katayama | ..................... | 718/102 |
| 7,302,600 B2 | 11/2007 | Bibikar et al. | | |
| 7,340,624 B2 * | 3/2008 | Kurakane | ....................... | 713/322 |
| 8,046,617 B2 | 10/2011 | Fleck et al. | | |
| 2003/0006807 A1 * | 1/2003 | Masuda et al. | ................... | 327/99 |
| 2003/0105983 A1 * | 6/2003 | Brakmo et al. | ................ | 713/320 |
| 2004/0128569 A1 | 7/2004 | Wyatt et al. | | |
| 2005/0028016 A1 * | 2/2005 | Matsushima et al. | .......... | 713/322 |
| 2006/0031692 A1 * | 2/2006 | Kato et al. | ...................... | 713/300 |
| 2006/0041766 A1 * | 2/2006 | Adachi | .......................... | 713/322 |
| 2006/0126610 A1 * | 6/2006 | Ryan et al. | ...................... | 370/388 |
| 2006/0174142 A1 * | 8/2006 | Lin et al. | ........................ | 713/300 |
| 2007/0079148 A1 | 4/2007 | Pastorello et al. | | |
| 2007/0220289 A1 * | 9/2007 | Holle et al. | .................... | 713/300 |
| 2008/0072087 A1 | 3/2008 | Bibikar et al. | | |
| 2008/0080648 A1 * | 4/2008 | Leung et al. | ................... | 375/354 |
| 2008/0307240 A1 | 12/2008 | Dahan et al. | | |

(Continued)

FOREIGN PATENT DOCUMENTS

| | | | | | |
|---|---|---|---|---|---|
| JP | 03033943 A | * | 2/1991 | .............. | G06F 11/28 |
| JP | 03100710 A | * | 4/1991 | ................ | G06F 1/04 |

(Continued)

OTHER PUBLICATIONS

Qi Wang; Roy, S., "Power minimization by clock root gating," Design Automation Conference, 2003. Proceedings of the ASP-DAC 2003. Asia and South Pacific, pp. 249,254, Jan. 21-24, 2003.*

(Continued)

*Primary Examiner* — Faisal M Zaman
(74) *Attorney, Agent, or Firm* — Lee & Hayes, PLLC

(57) ABSTRACT

A deep idle mode for electronic devices is described, which provides significant power savings while allowing significantly shorter resumption times than experienced with a suspend mode. During deep idle mode, a root clock such as the microcontroller unit phase-locked loop (MPLL) is scaled or gated entirely and other clocks such as the processor, memory, and general purpose timer clocks may be scaled. To maintain functionality while these clocks are scaled or gated, an external clock source couples to the processor, memory, and a general purpose timer.

23 Claims, 10 Drawing Sheets

(56) References Cited

U.S. PATENT DOCUMENTS

| | | | |
|---|---|---|---|
| 2008/0313487 A1* | 12/2008 | Mochizuki et al. | 713/601 |
| 2009/0153108 A1 | 6/2009 | Hendin et al. | |
| 2009/0193230 A1* | 7/2009 | Findeisen et al. | 712/34 |
| 2009/0235104 A1* | 9/2009 | Fung | 713/324 |
| 2010/0060078 A1 | 3/2010 | Shaw | |
| 2010/0185820 A1 | 7/2010 | Hughes et al. | |
| 2010/0218183 A1* | 8/2010 | Wang et al. | 718/1 |
| 2010/0250974 A1 | 9/2010 | Ristic et al. | |
| 2010/0306429 A1* | 12/2010 | How et al. | 710/105 |
| 2011/0025383 A1* | 2/2011 | De Martini et al. | 327/143 |
| 2011/0154080 A1* | 6/2011 | Wang et al. | 713/323 |
| 2011/0296215 A1* | 12/2011 | Mobin et al. | 713/323 |
| 2013/0145190 A1* | 6/2013 | Sakugawa et al. | 713/322 |

FOREIGN PATENT DOCUMENTS

| | | | | | |
|---|---|---|---|---|---|
| JP | 2000242359 A | * | 9/2000 | | G06F 1/10 |
| JP | 2003196149 A | * | 7/2003 | | G06F 12/00 |
| JP | 2005092489 A | * | 4/2005 | | G06F 3/06 |
| JP | 2009129077 A | * | 6/2009 | | G06F 12/00 |
| JP | 2011013859 A | * | 1/2011 | | G06F 3/06 |

OTHER PUBLICATIONS

Myung-Soo Jang; Joo-Hyun Park; Young-Nam Yeon; Jin-Yong Lee; Kyu-Myung Choi; Jeong-Taek Kong, "Clock network analysis at the pre-layout stage for efficient clock tree synthesis [SOC design]," ASIC/SOC Conference, 2002. 15th Annual IEEE International , pp. 363,367, Sep. 25-28, 2002.*

Guirong Wu; Song Jia; Yuan Wang; Ganggang Zhang, "An efficient clock tree synthesis method in physical design," Electron Devices and Solid-State Circuits, 2009. EDSSC 2009. IEEE International Conference of , pp. 190,193, Dec. 25-27, 2009.*

Vittal, A.; Marek-Sadowska, M., "Low-power buffered clock tree design," Computer-Aided Design of Integrated Circuits and Systems, IEEE Transactions on , vol. 16, No. 9, pp. 965,975, Sep. 1997.*

"Freescale Semiconductor Date Sheet: Technical Data—MIMX31 and MCIMX31L Multimedia Applications Processors" Document No. MCIMX31, <<http://www.freescale.com/files/32bit/doc/data_sheet/MCIMX31.pdf?fsrch=1>>, available at least as early as Nov. 2008, 122 pages.

Non-Final Office Action for U.S. Appl. No. 12/488,814, mailed on Oct. 23, 2012, Manish Lachwani et al., "Quiescent State Retention Mode for Processor", 8 pages.

Non-Final Office Action for U.S. Appl. No. 12/488,814, mailed on Nov. 18, 2011, Manish Lachwani, "Quiescent State Retention Mode for Processor", 6 pages.

Final Office Action for U.S. Appl. No. 12/488,814, mailed on Mar. 23, 2012, Manish Lachwani et al., "Quiescent State Retention Mode for Processor", 6 pages.

"MCIMX31 and MCIMX31L Applications Processors Reference Manual" <<http://www.freescale.com/files/32bit/doc/ref_manual/MCIMX31RM.pdf?fsrch=1>> available at least as early as Dec. 2008, 350 pages, part 2.

"MCIMX31 and MCIMX31L Applications Processors Reference Manual" <<http://www.freescale.com/files/32bit/doc/ref_manual/MCIMX31RM.pdf?fsrch=1>> available at least as early as Dec. 2008, 350 pages, part 3.

"MCIMX31 and MCIMX31L Applications Processors Reference Manual" <<http://www.freescale.com/files/32bit/doc/ref_manual/MCIMX31RM.pdf?fsrch=1>> available at least as early as Dec. 2008, 350 pages, part 4.

"MCIMX31 and MCIMX31L Applications Processors Reference Manual" <<http://www.freescale.com/files/32bit/doc/ref_manual/MCIMX31RM.pdf?fsrch=1>> available at least as early as Dec. 2008, 350 pages, part 5.

"MCIMX31 and MCIMX31L Applications Processors Reference Manual" <<http://www.freescale.com/files/32bit/doc/ref_manual/MCIMX31RM.pdf?fsrch=1>> available at least as early as Dec. 2008, 350 pages, part 6.

"MCIMX31 and MCIMX31L Applications Processors Reference Manual" <<http://www.freescale.com/files/32bit/doc/ref_manual/MCIMX31RM.pdf?fsrch=1>> available at least as early as Dec. 2008, 368 pages, part 7.

"MCIMX31 and MCIMX31L Applications Processors Reference Manual" <<http://www.freescale.com/files/32bit/doc/ref_manual/MCIMX31RM.pdf?fsrch=1>> available at least as early as Dec. 2008, 350 pages part 1.

* cited by examiner

DEEP IDLE MODE

BACKGROUND

Electronic devices, such as electronic book readers ("eBook reader devices"), cellular telephones, portable media players, desktop computers, laptops, tablet computers, netbooks, personal digital assistants, and the like, rely on electrical power to function. In the case of mobile devices, a battery with a finite storage capacity often provides power.

To reduce power consumption and extend operating time while using battery, these electronic devices may utilize different modes such as idle modes and suspend modes. Traditional idle modes allow for rapid restoration to a fully operational mode, however power consumption remains relatively significant. Suspend modes offer significant power savings, but may require significant periods of time to resume the fully operational mode. What is desired is an intermediate state that allows for significant reduction in power consumption while minimizing the time to resume full operation.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
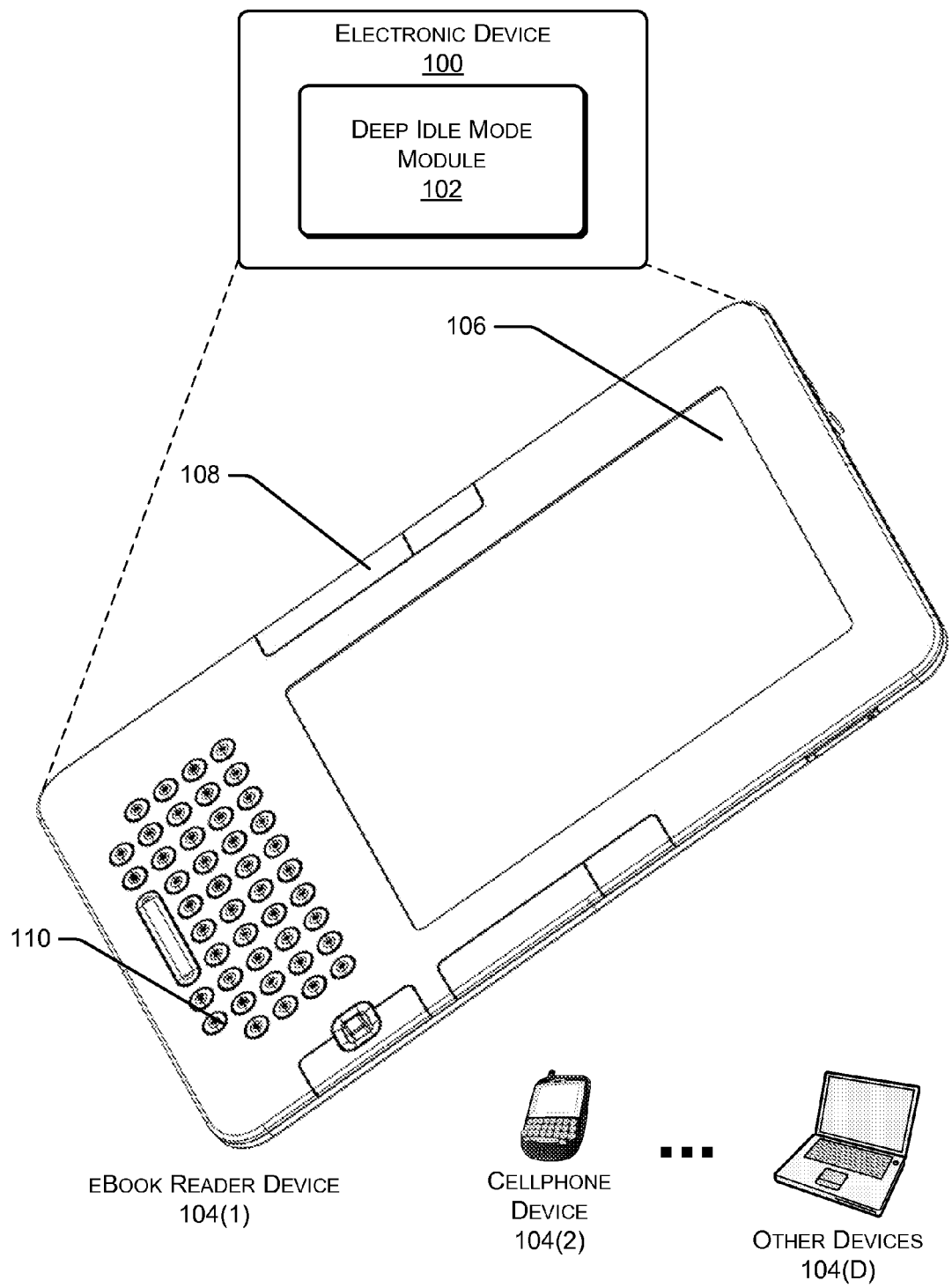
FIG. 1 is an illustrative electronic device (here, an eBook reader device) configured with a deep idle mode module for placing the eBook reader device into a deep idle mode.

An electronic device may be placed into different modes of operation to conserve electric power. The techniques described in this disclosure enable the electronic device to enter a deep idle mode. The deep idle mode results in significant power savings compared to a normal operational mode while maintaining a reasonably fast resumption time. While in deep idle mode, a root clock may be scaled or gated, and other clocks such as a processor clock and a memory clock may also be scaled.

Scaling involves reducing the frequency of a clock, which in turn reduces power consumption. Gating disables at least a portion of a circuit such as a clock, which further reduces power consumption by eliminating switching power consumption. Thus, by scaling and/or gating clocks, power consumption of the electronic device is reduced.

By gating the root clock and scaling the processor and memory clocks in the deep idle mode, power consumption is significantly reduced as compared to the traditional idle mode. To maintain the ability of the device to respond while the root clock is gated or scaled in the deep idle mode, an external clock provides a timing signal to selected components such as the processor, memory, and general purpose timer. By providing the timing from the external clock while in the deep idle mode, time to resume the operating mode is less than that required to resume from the suspend mode.

The device may transition from operational to deep idle mode when the processor is determined to be idle. The determination of when the processor is idle may be accomplished in several ways. In one implementation, the device is deemed idle when a count of the number of timer interrupts within a specified period is below a pre-determined threshold. In another implementation, the device counts of a number of consecutive sample periods during which a clock is at a specified clock rate. When the count of the number of periods exceeds a pre-determined threshold, the device may be deemed to be idle, and the system may proceed to enter the deep idle mode. Furthermore, the determination of when the device is idle may also be accomplished in many other ways.

An electronic device utilizing a processor capable of entering a low power mode and that has an external clock may implement these techniques. The "external clock" may include a clock which is on the same or a separate die from other devices including the processor. For example, the i.MX architecture from Freescale™ Semiconductor Incorporated, of Austin, Tex., United States of America, is one suitable family of processors.

The processor executes an operating system, including, but not limited to, Linux®, UNIX®, Microsoft Corporation's Microsoft Windows®, Microsoft Corporation's Windows Mobile®, Apple Corporation's Mac OS®, Apple Corporation's Mac OS X®, and Wind River Systems Inc.'s VxWorks®.

For example, an eBook reader device may incorporate a Freescale™ processor having an i.MX architecture including a low-frequency external clock and executing a Linux® kernel. The kernel uses device drivers to communicate with peripheral devices such as the external memory interfaces (EMIs), Universal Serial Bus (USB) controllers, image processing units (IPUs), and so forth. These peripheral devices may reside on the same "chip" or die as the processor as in the case of the i.MX architecture and/or may reside on another die.

While these techniques are described in terms of an eBook reader device, the concepts described herein may also be applicable to cellular telephones, portable media players, desktop computers, laptops, tablet computers, netbooks, personal digital assistants, or other electronic devices.

Illustrative eBook Reader Device

FIG. 1 depicts an illustrative electronic device 100 having a display, a touch sensor, user controls, and a deep idle mode module 102. Briefly, the deep idle mode module 102 places the device 100 into a deep idle mode where a root clock is gated and other clocks such as the processor and memory may be scaled to lower frequencies and receive timing from an external clock. While in the deep idle mode, the device consumes significantly less power than compared to a normal operational mode. In addition, the device may resume from the deep idle mode in a reasonably short amount of time.

The electronic devices 100 include cellular phones, portable media players, tablet computers, netbooks, laptops, personal computers, cash registers, electronic book ("eBook") readers, servers, medical devices, data acquisition devices, and so forth. Because of this wide applicability, several devices are shown in this illustration that may utilize the deep idle mode module 102. For example, an electronic book (eBook) reader device 104(1) is shown embodied as a handheld, dedicated eBook reader device. FIG. 1 also illustrates that a cellphone device 104(2) and other devices 104(D), such as a netbook computer, may include and implement the deep idle mode module 102. As used herein, letters within parenthesis such as "(D)" indicate an integer greater than zero.

The eBook reader device 104(1) may have a display 106 to present content in a human-readable format to a user. The display 106 may be reflective, emissive, or a combination of both. Reflective displays utilize incident light and include electrophoretic displays, interferometric modulator displays, cholesteric displays, and so forth. Emissive displays do not rely on incident light and, instead, emit light. Emissive displays include backlit liquid crystal displays, time multiplexed optical shutter displays, light emitting diode displays, and so forth. When multiple displays are present, these displays may be of the same or different types. For example, one display may be an electrophoretic display while another may be a liquid crystal display.

For convenience only, the display 106 is shown in a generally rectangular configuration. However, it is understood that the display 106 may be implemented in any shape, and may have any ratio of height to width. Also, for stylistic or design purposes, the display 106 may be curved or otherwise non-linearly shaped. Furthermore the display 106 may be flexible and configured to fold or roll.

The content presented on the display 106 may take the form of electronic books or "eBooks." For example, the display 106 may depict the text of the eBooks and also any illustrations, tables, or graphic elements that might be contained in the eBooks. The terms "book" and/or "eBook," as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, and so forth. Accordingly, the terms "book" and/or "eBook" may include any readable or viewable content that is in electronic or digital form.

The electronic device 100 may include a touch sensor for user input. For example, the display 106 of the eBook reader device 104(1) may include a touch sensor, resulting in a touch screen that allow user input through contact or gesturing relative to the display.

The eBook reader device 104(1) may also incorporate one or more user actuable controls such as a buttons 108 and a keyboard 110 for user input. The one or more user actuable controls may have dedicated or assigned operations. For instance, the user actuable controls may include page turning buttons, a joystick, navigational keys, a power on/off button, selection keys, and so on.

While one embodiment of an electronic device 100 is shown in relation to the eBook reader device 104(1), it is understood that electronic devices include cellular telephones 104(2), and other devices 104(D) such as portable media players, tablet computers, netbooks, laptops, personal computers, cash registers, servers, medical devices, data acquisition devices, and the like.

Figure 2:
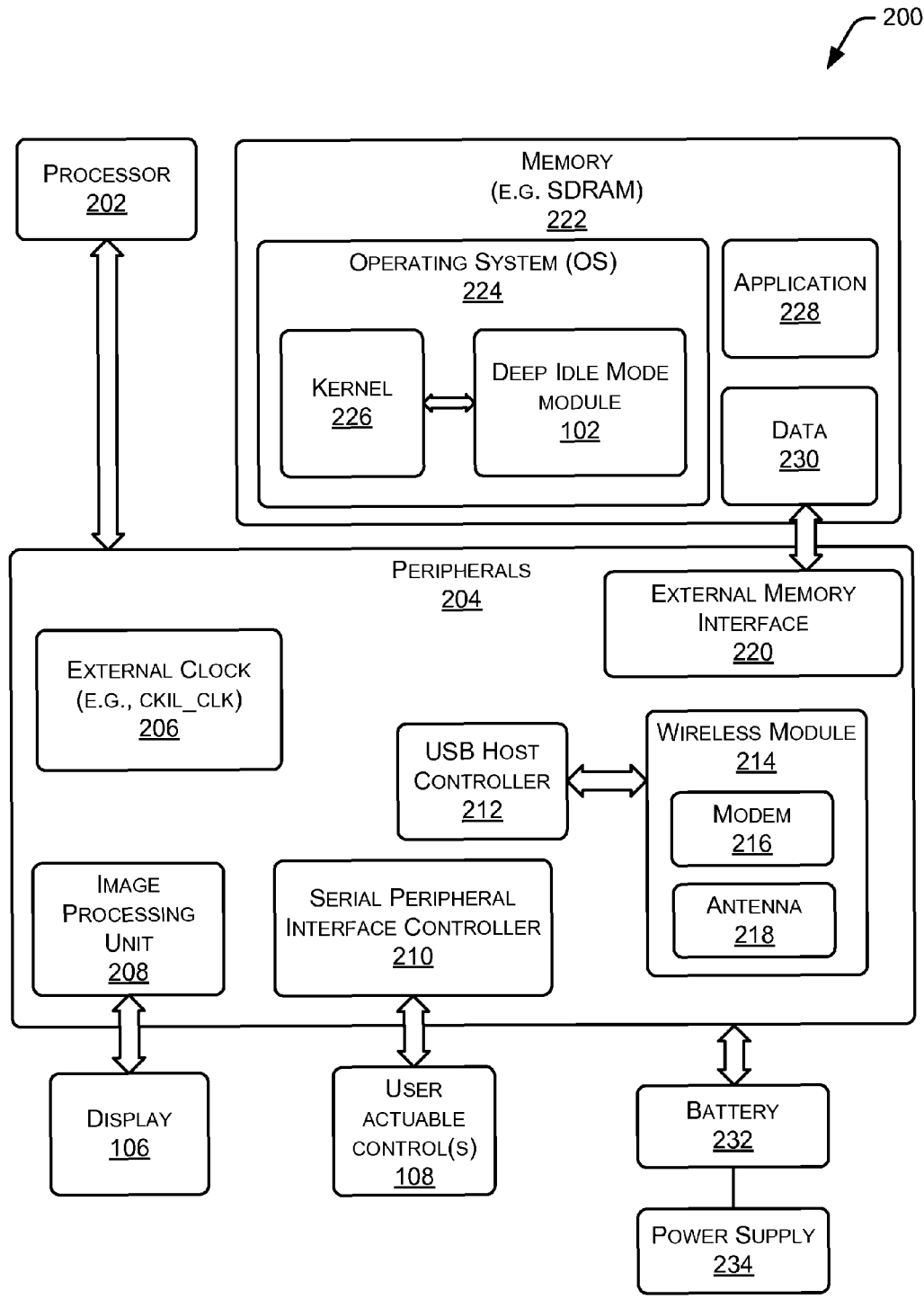
FIG. 2 is an illustrative schematic of the electronic device configured to use the deep idle mode module of FIG. 1.

FIG. 2 is a block diagram 200 of the illustrative electronic device 100 showing the internal components. In a very basic configuration, the device 100 includes or accesses components such as a processor 202 and one or more peripherals 204. Each processor 202 may itself comprise one or more processors.

The peripherals 204 couple to the processor 202. Among these peripherals is an external clock 206. The external clock 206 is configured to provide a timing signal. In some implementations this external clock 206 may be a low frequency clock having a frequency of less than 1 MHz. For example, within the i.MX architecture from Freescale™ the external clock 206 may comprise the low frequency external clock designated "ckil" also known as the "32 kHz clock." This clock is external in that it operates independently of other clocks within the system. The external clock 206 may be contained on the same die or a different die as the processor 202. For example, the external clock 206 may be present within a power management integrated circuit (PMIC) such as the Atlas PMIC from Freescale™

An image processing unit 208 is shown coupled to one or more displays 106. The display 106 presents content in a human-readable format to a user. In some implementations, multiple displays may be present and coupled to the image processing unit 208. These multiple displays may be located in the same or different enclosures or panels. When multiple displays are present, these displays may be of the same or different types. For example, one display may be an electrophoretic display while another may be interferometric. Furthermore, one or more image processing units 208 may couple to the multiple displays.

FIG. 2 further illustrates that the electronic device 100 includes a serial peripheral interface ("SPI") controller 208 and associated SPI bus. The SPI bus allows for synchronous serial data exchange. SPI is also known as a "four-wire" serial bus due to the number of conductors used. In some implementations, the SPI controller 208 may also be considered the SPI bus master.

Various peripherals may couple to the device via SPI or other interfaces. For example, one or more user actuable controls 108 may couple to the device via the SPI controller 208. These user actuable controls 108 may have dedicated or assigned operations, and may include page turning buttons, a joystick, navigational keys, touch sensor, a power on/off button, selection keys, and so on.

The peripherals 204 may include a USB host controller 212. The USB host controller 212 manages communications between components attached to a universal serial bus ("USB") and the processor 202 and other peripherals.

The USB host controller 212 may also couple to a wireless module 214 via the universal serial bus. The wireless module 214 may allow for connection to wireless local or wireless wide area networks ("WWAN"). The wireless module 214 may include a modem 216 configured to send and receive data wirelessly and one or more antennas 218 suitable for propagating a wireless signal. In other implementations, a wired network interface may be provided.

The electronic device 100 may also include an external memory interface ("EMI") 220 coupled to external memory 222. The EMI 220 manages access to data stored in the external memory 222. The external memory 222 may comprise Static Random Access Memory ("SRAM"), Pseudostatic Random Access Memory ("PSRAM"), Synchronous Dynamic Random Access Memory ("SDRAM"), Double Data Rate SDRAM ("DDR"), Phase-Change RAM ("PCRAM"), or other computer-readable storage media.

The external memory 222 may store an operating system 224 comprising a kernel 226 operatively coupled to the deep idle mode module 102. The deep idle mode module 102 also operatively couples to the peripherals 204. The external memory 222 may also store executable applications 228 as well as data 230, which may comprise content objects for consumption on the electronic device 100, databases, user settings, configuration files, device status, and so forth.

The electronic device 100 may include one or more other, non-illustrated peripherals, such as a hard drive using magnetic, optical, or solid state storage to store information, a firewire bus, a Bluetooth™ wireless network interface, camera, global positioning system, PC Card component, and so forth.

One or more batteries 232 may provide operational electrical power to components of the electronic device 100 for operation when the device is disconnected from a power supply 234. Operational electrical power is sufficient to provide for operation of the device, as distinguished from the lesser electrical power requirements of the deep idle mode or a suspend mode. Power supply 234 may be internal or external to the electronic device 100. The power supply 234 is configured to provide operational power for electronic device 100, charge battery 232, or both. "Battery" as used in this application includes components capable of acting as a power source to an electronic device. Power sources include chemical storage cells such as lithium polymer batteries, charge storage devices such as ultracapacitors, fuel cells, and so forth.

Couplings, such as that between kernel 226 and the deep idle mode module 102, are shown for emphasis. There are couplings between many of the components illustrated in FIG. 2, but graphical arrows are omitted for clarity of illustration.

Illustrative Partial Clock Tree and External Clock

Figure 3:
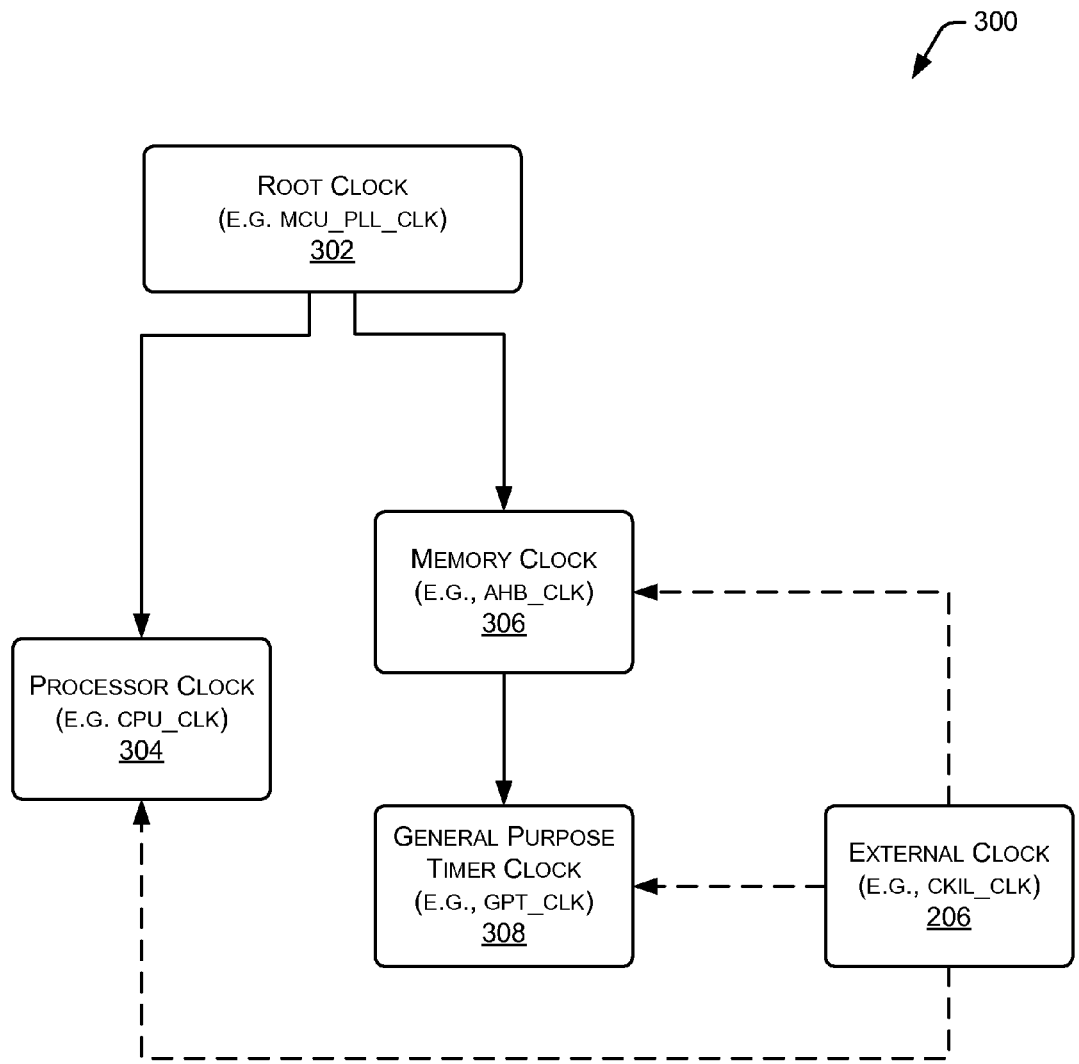
FIG. 3 is an illustrative schematic of a portion of a clock tree of the electronic device configured to use an external clock while in the deep idle mode.

FIG. 3 is an illustrative schematic of a portion of a clock tree 300 of the electronic device 100. A clock tree is an arrangement of interconnected clocks that provide for the proper operation of various components within the electronic device both independently and with regard to one another. During normal full power operation, a root clock 302 provides a primary timing signal, from which other subordinate clocks may derive their timing. For example, within the i.MX architecture the microcontroller unit phase-locked loop (MPLL) clock mcu_pll_clk may be considered the root clock. In other architectures, other clocks may perform the root clock function.

Subordinate to the root clock 302 may be a processor clock 304. This processor clock 304 sets the frequency at which the processor 202 executes. In many situations, the processor clock 304 may be scaled between a low and a high value. Scaling allows the power consumption of the processor to be minimized by matching the demands of a given task with an appropriate speed or frequency of the processor. For example, during computationally intensive tasks the processor clock may operate at a highest available frequency. Similarly, during less intensive tasks or when power is at a premium, the processor clock may operate at a low frequency to minimize power consumption.

Also shown subordinate to the root clock 302 is the memory clock 306. The memory clock 306 provides the timing signal used by memory components and associated subsystems. Within the i.MX architecture this clock is part of the Advanced High-performance Bus (AHB) and is known as the "ahb_clk."

A general purpose timer (GPT) clock 308 may be present. As shown here, in some implementations the GPT clock 308 is subordinate to the memory clock 306. Within the i.MX architecture this clock is known as the "gpt_clk" and uses a frequency divider to drop the frequency of the timing signals received from the memory clock 306. As a result of this dependency and the use of the frequency divider, as described below with regards to FIG. 9, the GPT clock 308 may be switched during deep idle mode to use the external clock 206 rather than the memory clock 306 as a timing source. Broken lines such as those connecting the external clock 206 and the GPT clock 308 designate couplings which are used during the deep idle mode. Once switched to receive timing signals from the memory clock 306 to the external clock 206, the memory clock 306 may be scaled without adversely affecting the GPT clock 308.

During the deep idle mode, the external clock 206 provides timing to the processor clock 304 and the memory clock 306 as well. This allows the root clock 302 and the memory clock 306 to be gated, while still allowing the device 100 to respond relatively quickly to an event and resume normal operation.

Illustrative Processes for Deep Idle Mode

The processes described herein may be implemented by the architecture described above, or by other architectures. These processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

Figure 4:
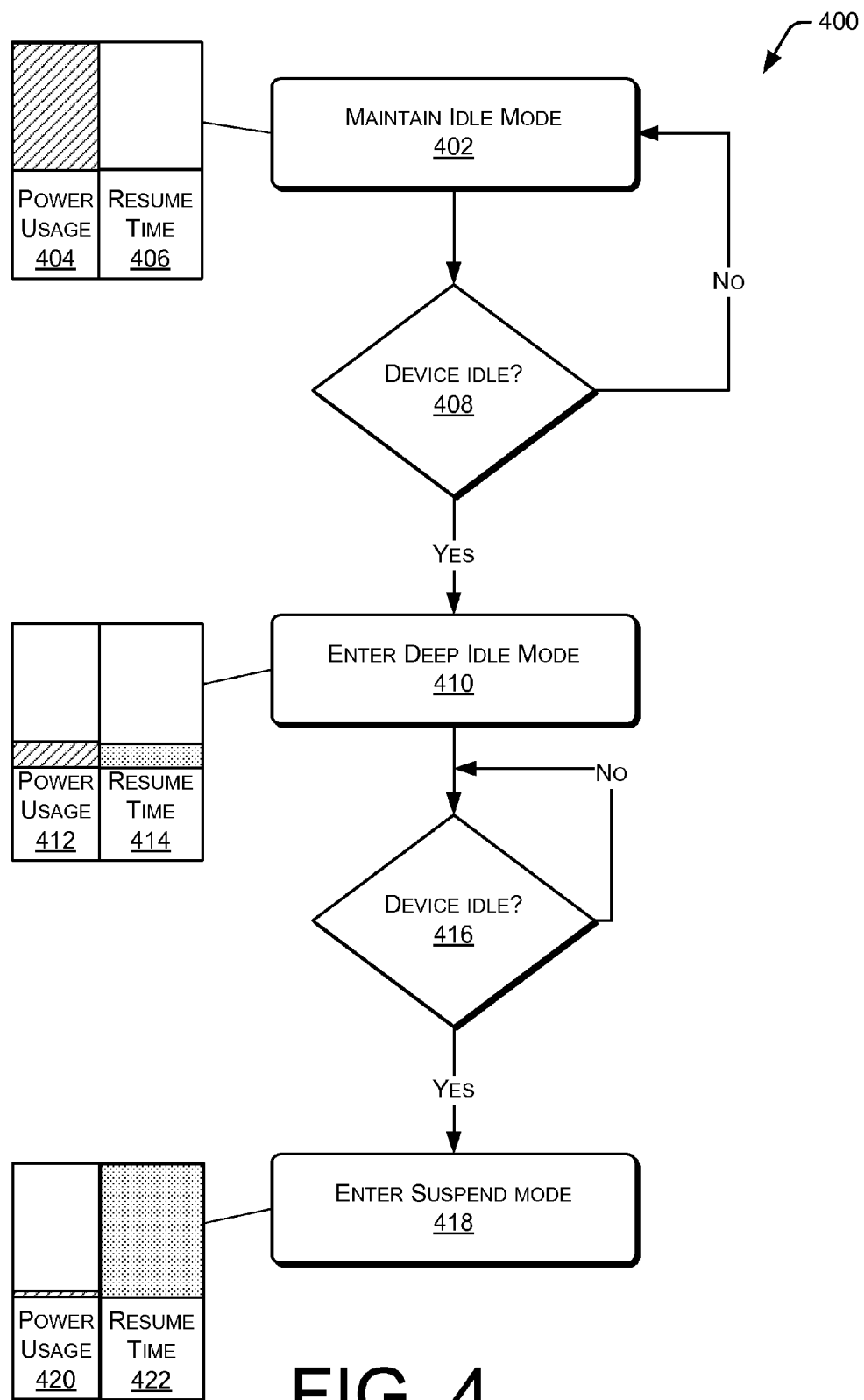
FIG. 4 is an illustrative process of transitioning from idle mode, to deep idle mode, to suspend mode. This figure also illustrates relative power usage and resumption times for these different modes.

FIG. 4 is an illustrative process 400 of transitioning from idle mode, to deep idle mode, to suspend mode. FIG. 4 also illustrates the relative power usage and resumption times for these respective modes.

At 402, the device 100 maintains an idle mode. During idle mode some subsidiary clocks within the device may be gated. Graph 404 shows that compared to the suspend mode, the power usage is at a relative maximum. However, the time to resume is quite short. For example, within the i.MX architecture, the power usage while in idle mode may be 15 milliAmperes (mA) while the resume time 406 is on the order of 50 milliseconds (ms) or better.

While in low power modes, the device may be configured to resume normal operation to perform various tasks including checking whether tasks are queued for processing. This resumption may occur upon receipt of an interrupt, including a periodic timer. During these periodic awakenings to normal operation, the device 100 may look to see how busy it has been. When at 408 the device 100 is determined to be sufficiently idle to warrant a lower power mode, the process proceeds at 410 to enter the deep idle mode. Various options to determine when the system is idle are described below in more depth with regards to FIGS. 5-6.

At 410, the device 100 enters the deep idle mode. Entry into the deep idle mode is discussed with regards to FIGS. 7-10. While in the deep idle mode power usage drops while resume time increases. For example, within the i.MX architecture power usage 412 while in the deep idle mode may be about 3 mA, while resume time 414 may be less than two seconds.

When at 416 the system is again determined to be sufficiently idle to warrant an even lower power mode, the process may proceed to 418 and enter suspend mode. During suspend mode additional clocks and other devices such as certain peripherals may be gated or placed into lower power states. As shown by graph 420, during suspend mode power usage drops significantly compared to regular idle mode. However, this power savings comes with the tradeoff of significantly increased resume time 422. Within the i.MX architecture, power usage may drop to 0.7 mA while in the suspend mode, while resume time to full operation is less than eleven seconds.

With the low power consumption and reasonably fast resumption time, the deep idle mode provides a useful compromise between power savings and resume time. As a result, users experience a system that is still reasonably responsive while also consuming less power and thus providing longer operational periods when using battery power.

Figure 5:
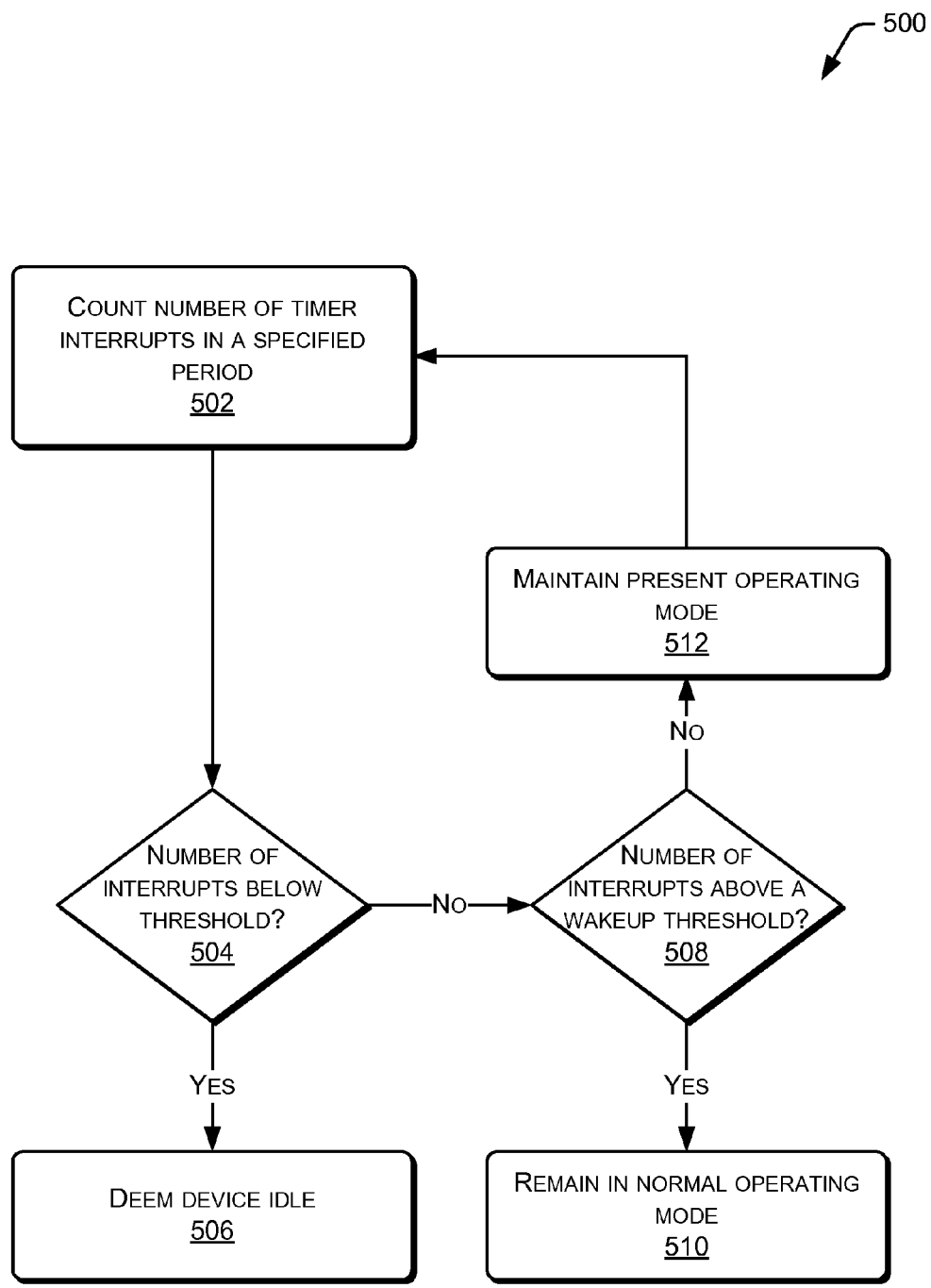
FIG. 5 is an illustrative process of determining when to enter deep idle mode.

FIG. 5 is an illustrative process 500 of determining when the device 100 is idle and thus entry to a lower power-consuming mode such as the deep idle mode or the suspend mode is appropriate. To conserve battery life, it is desirable to maintain the device 100 in one of the lower power modes as frequently and as long as possible. Ideally, it is desirable to enter the lowest power mode, which consumes the lowest amount of power, while providing for resumption time acceptable to the situation in which the device 100 is used. Should the device enter a lower power mode such as the deep idle mode or the suspend mode too frequently, the user of the device 100 may experience undesirable delays while waiting for the device to resume. Likewise, failure to enter the lower power mode such as the deep idle mode soon enough or often enough wastes battery power.

The deep idle mode may be appropriate when the device 100 is idle. In some instances, determining when the device is "idle" may be accomplished by monitoring interrupts within the device 100. At 502, the deep idle mode module 102 counts a number of timer interrupts which occur within a specified time period. At 504, when the number of interrupts during the period is below a pre-determined threshold, the process proceeds to 506. At 506, the device 100 is deemed sufficiently idle to warrant a change to a lower power mode.

When the number of interrupts is not below the pre-determined threshold, the process continues to 508. At 508, when the number of interrupts is above a wakeup threshold, the process proceeds to 510. At 510, the system remains in the normal operating mode until triggered to enter a lower power mode.

Returning to 508, when the number of interrupts is not above a wakeup threshold the process proceeds to 512. At 512, the system maintains the present operating mode, such as the idle mode, the deep idle mode, the suspend mode, and so forth. The process then proceeds to 502, again to count the number of timer interrupts with the specified period. In some implementations, when at 504 the number of interrupts is below the pre-determined threshold, the process may proceed directly to 502.

Figure 6:
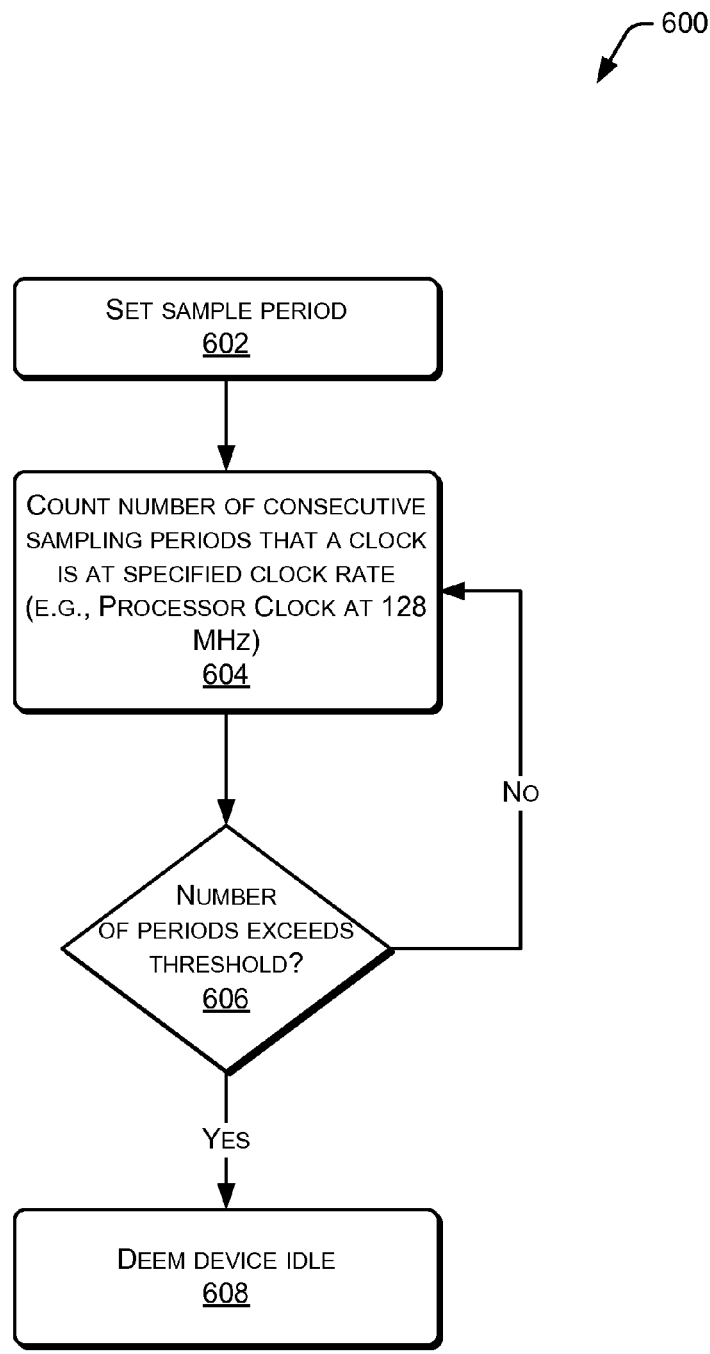
FIG. 6 is an illustrative process of another implementation of determining when to enter deep idle mode.

FIG. 6 is an illustrative process 600 of another implementation of determining when the device 100 is idle. In this implementation, at 602 the deep idle mode module 102 sets a sample period or interval. At 604, the deep idle mode module 102 counts the number of consecutive sampling periods during which a clock is at a specified clock rate. For example, the deep idle mode module 102 may count the number of consecutive sampling periods during which the processor clock is at a particular clock rate, such as a low rate of 128 MHz (as compared to a high rate of 512 MHz) or some other level.

When at 606, the deep idle mode module 102 determines when the number of consecutive periods exceeds a pre-determined threshold, the process continues to 608. At 608, the device is deemed idle. Once the device is deemed idle, a lower power mode such as the deep idle mode or the suspend mode may be entered.

Additionally, in some implementations the determination of when the system is idle may be influenced by other factors, such as particular events, userspace events, and so forth. For example, when the user of the eBook reader device 104(1) turns the page, a system event may be used to notify the deep idle mode module 102 and the device may more quickly enter the deep idle mode.

Figure 7:
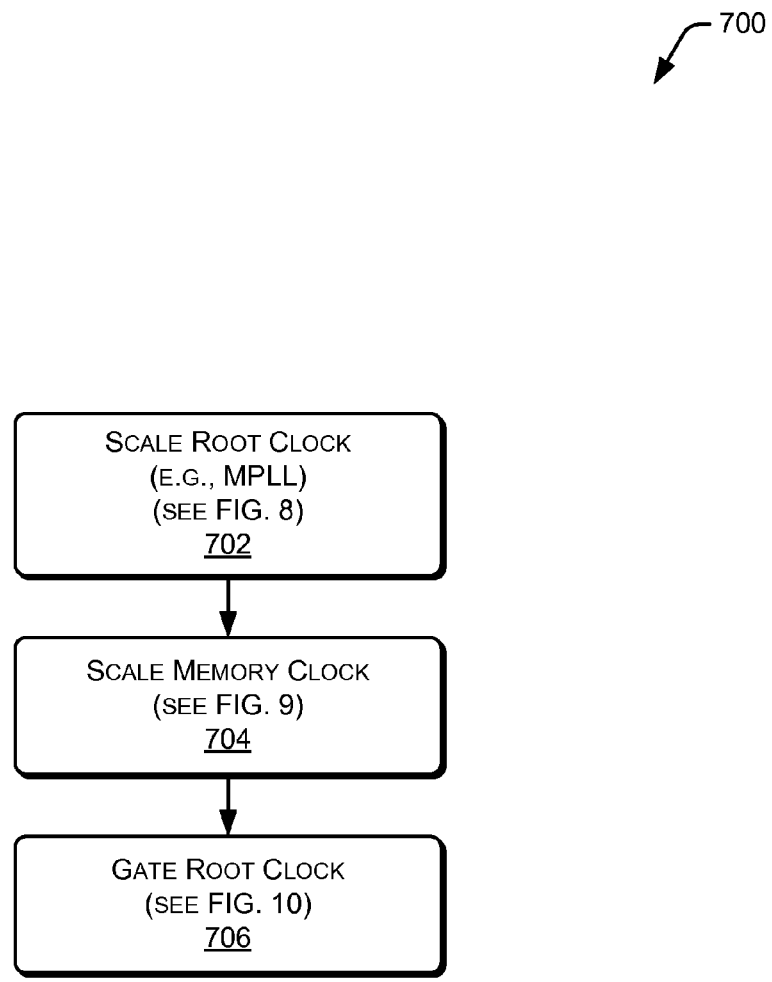
FIG. 7 is an illustrative process of entering the deep idle mode.

FIG. 7 is an illustrative process 700 of entering the deep idle mode. Unless otherwise indicated, the following actions may be performed by the deep idle mode module 102. At 702, the root clock 302 is scaled to a lower frequency. Such a drop in frequency reduces power consumption. This process is described in more depth below with regards to FIG. 8.

At 704, the memory clock 306 is scaled. In some architectures, other clocks such as the GPT timer clock 308 may derive timing signals from the memory clock 306. As a result, the GPT timer clock 308 may be reconfigured to acquire timing signals from the external clock 206. This process is described in more depth below with regards to FIG. 9.

At 706, the root clock 306 is gated. The root clock 306 may be gated because various systems such as the processor clock 304, the memory clock 306, the GPT timer clock 308, and so forth have been transferred to use clock signals from the external clock 206. This process is described in more depth below with regards to FIG. 10.

When the device 100 is to resume normal operation the process 700 may be generally reversed, albeit with some minor modifications. For example, the various clocks such as the root clock may be enabled towards the beginning of the resumption process.

Figure 8:
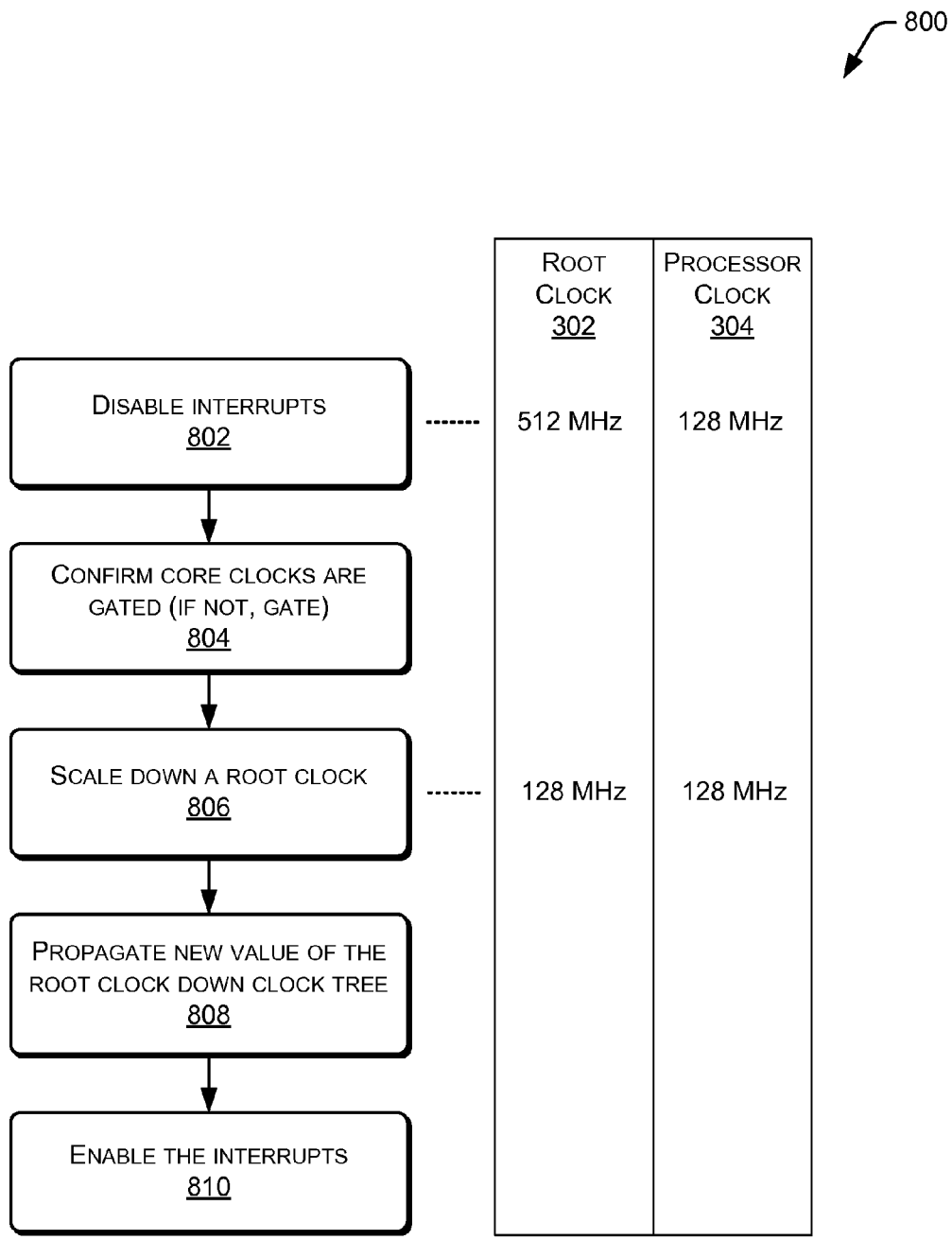
FIG. 8 is an illustrative process of scaling the root clock of the clock tree in the electronic device.

FIG. 8 is an illustrative process 1000 of scaling the root clock 302 of the clock tree 300 in the device 100. In this illustration, the frequencies of the root clock 302 and the processor clock 304 are shown as they change in response to the process 1000. Unless otherwise indicated, the following actions may be performed by the deep idle mode module 102. At 802, interrupts are disabled. This prevents interruptions during the scaling of the root clock 302. As shown in this illustration, the root clock 302 is shown at 512 MHz and the processor clock 304 is operating at 128 MHz. In some implementations all interrupts may be disabled.

At 804, the module 102 confirms the core clocks are gated, and if they are not, gates them. Core clocks are those which provide timing signals for significant subsystems, and may also have clocks subordinate to them which are dependent on the core clock for a timing signal. Core clocks within the i.MX architecture include, but are not limited to, usb_pll_clk, usb_ahb_clk, sdma_clk, emi_clk, peri_pll_clk, sdhc_clk, and so forth. In some implementations this confirmatory step may be omitted.

At 806, the root clock 302 is scaled. For example, as shown here, the root clock has been reduced from 512 MHz to 128 MHz. Such a reduction reduces power consumption.

At 808, the new value of the root clock is propagated down through clocks within the clock tree 300. For example, in some implementations this may include settings register values in the various clocks. At 810, interrupts are enabled and operation at the lower root clock 302 frequency is possible.

As described above with regards to FIG. 7, during resumption of operational mode from the deep idle mode, the process 800 may occur generally in reverse, with some changes. For example, during resumption the root clock and core clocks would be engaged before propagating the new value of the root clock down the clock tree.

Figure 9:
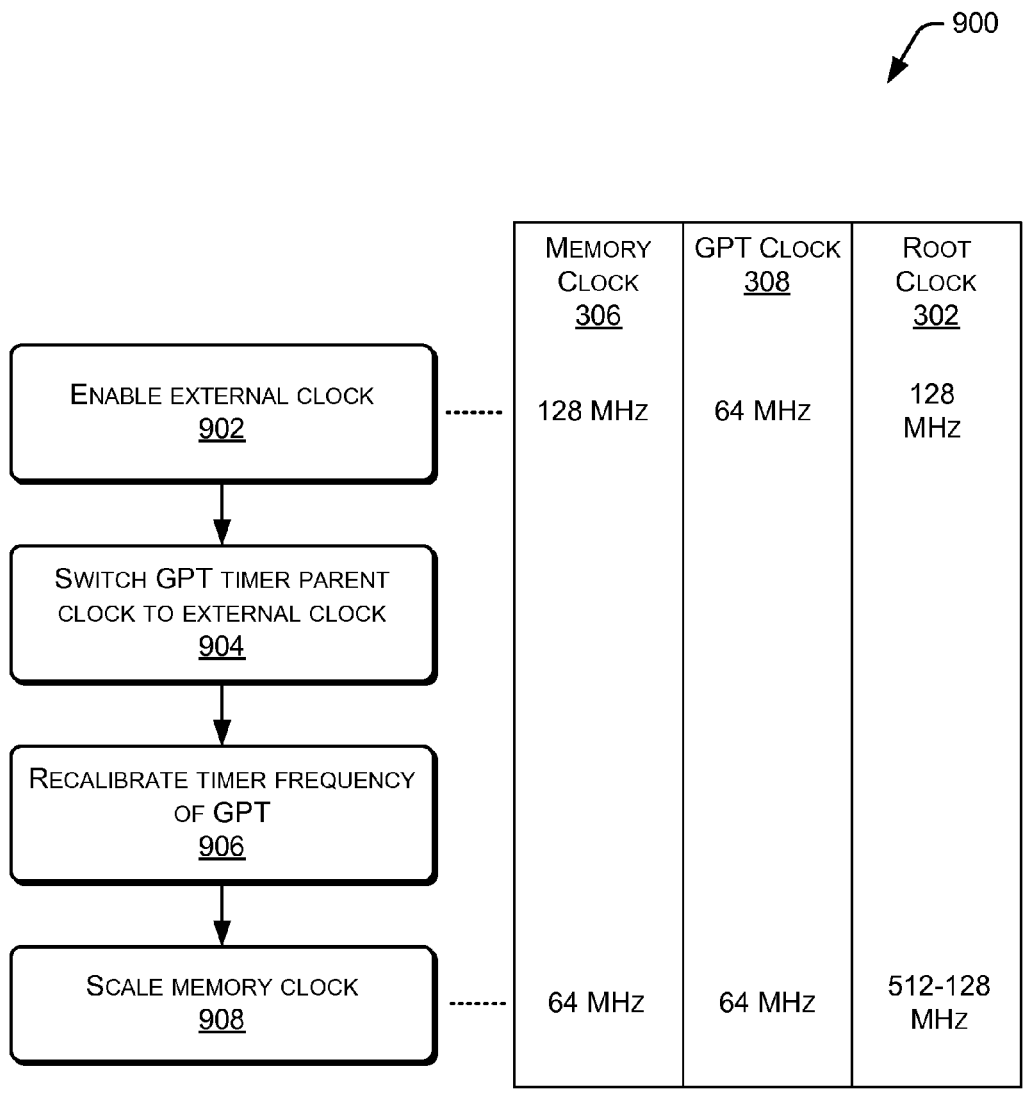
FIG. 9 is an illustrative process of scaling a memory clock in the electronic device.

FIG. 9 is an illustrative process 900 of scaling the memory clock 306 in the device 100. In this illustration, the frequencies of the memory clock 306, GPT clock 308, and the root clock 302 are shown as they change in response to the following process. The frequencies depicted are for illustration and not limitation. Unless otherwise indicated, the following actions may be performed by the deep idle mode module 102.

At 902, the external clock 206 is enabled. This enabling may include activating the external clock 206, coupling the external clock to devices such as the GPT clock 308, which will use the timing signal, and so forth. Once enabled, the external clock 206 delivers a timing signal suitable for use by another device or component within the device 100. As shown here, the memory clock 306 is shown at 128 MHz, while the GPT clock 308 is at 64 MHz and the root clock 302 has been scaled to 128 MHz. In some implementations, such as the i.MX architecture, the GPT clock 308 may be derived via a frequency divider from the memory clock 306. Thus, when the memory clock 306 is at 128 MHz, the GPT clock 308 operates at one-half of this value, or 64 MHz, as shown. This dependency thus introduces a problem when the memory clock 306 is to be scaled: changing the frequency of the memory clock 306 would require recalibration of the GPT clock 308. Recalibration, where available, requires additional time and other system resources. To maintain response times, it is thus desirable to minimize or eliminate occasions on which recalibration is called for, or minimize the extent of the recalibration.

To reduce the necessary recalibration, at 904 the GPT clock 308 is switched to use the external clock 206, rather than the memory clock 306. Such a switch frees the GPT clock 308 from its dependency on the memory clock 306. Furthermore, recalibration may be simplified because the external clock 206 and the memory clock 306 are operating at substantially the same frequency.

At 906, the timer frequency of the GPT clock 308 is recalibrated to correspond to the external clock 206. At 908, the memory clock 306 may now be scaled to a lower frequency, thus saving power. As shown here, the memory clock 306 is now scaled to 64 MHz, while the GPT clock 308 remains at 64 MHz. The root clock 302 may continue to operate at 128 MHz, be gated, or may be scaled up, such as to 512 MHz. In some implementations, when the memory bandwidth at the lower, scaled frequency (such as 64 MHz here) is sufficient for operation, the memory clock 306 need not scale immediately with changes in the root clock 302. As a result, the root clock 302 may be scaled up first, and the memory clock 306 may follow during another subsequent period. Scaling up the root clock 302 in one period and the memory clock 306 in another minimizes delays to the user.

As described above with regards to FIG. 7, during resumption of operational mode from the deep idle mode, the process 900 may occur generally in reverse, with some modifications. For example, the memory clock would be engaged before the GPT timer switched from the external clock.

Figure 10:
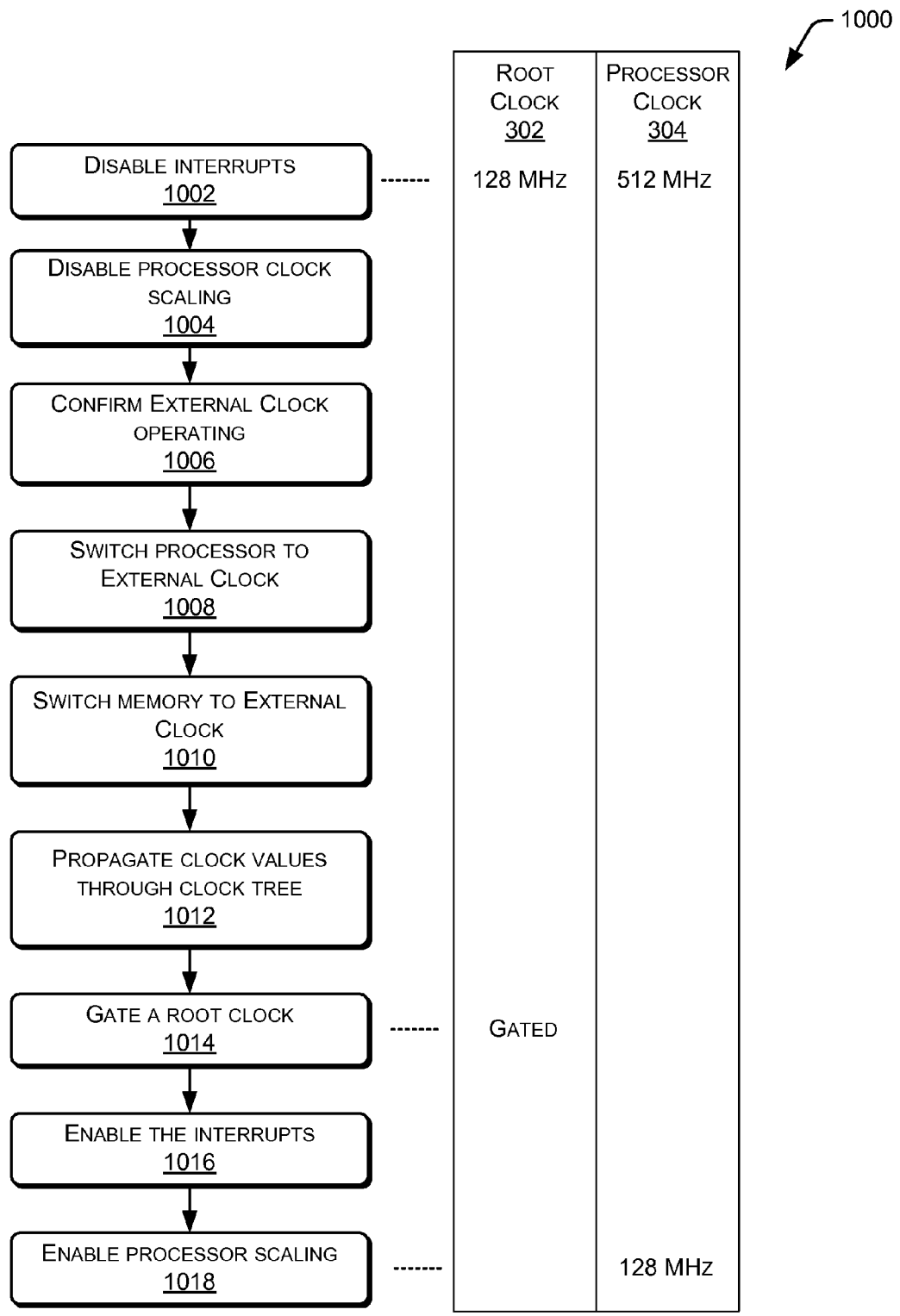
FIG. 10 is an illustrative process of gating the root clock in the electronic device.

FIG. 10 is an illustrative process 1000 of gating the root clock 302 in the device 100. Once the memory clock 306, the processor clock 304, and so forth have been scaled, the root clock 302 itself may be gated, and the device 100 may fully enter the deep idle mode.

Similar to the previous figures, in this illustration, the frequencies of the root clock 302 and processor clock 304 are shown as they change in response to the following process. Unless otherwise indicated, the following actions may be performed by the deep idle mode module 102.

Initially, the root clock 302 and the processor clock 304 may be at various frequencies within their operational range. As shown here, the root clock 302 is at 128 MHz and the processor clock 304 is at 512 MHz. At 1002, interrupts are disabled. In some implementations, all interrupts may be disabled. At 1004, processor clock 304 scaling is disabled. At 1006, operation of the external clock 206 is confirmed as operating. At 1008, the processor 202 is switched from the root clock 302 to use the external clock 206 as a timing source. At 1010, the memory 222 is switched to use the external clock 206. At 1012, updated clock values are propagated throughout the clock tree 300.

At 1014, the root clock 302 is gated. As a result, power consumption is reduced. The processor 202, memory 222, and other designated components continue to receive clocking from the external clock 206. As a result, they are able to more rapidly resume normal operation without having to wait for clocks to restart and settle.

At 1016, the interrupts are enabled. At 1018, processor scaling is enabled, and processor may adjust to a frequency which consumes less power, for example 128 MHz as shown here. At this point, the device 100 is in the deep idle mode. Power consumption is reduced significantly, yet the device remains able to resume operation reasonably quickly.

As described above with regards to FIG. 7, during resumption of operational mode from the deep idle mode, the process 1000 may occur generally in reverse, with some modifications. For example, the root clock, processor clock, and memory clock may be engaged before the components are switched from the external clock.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims For example, the methodological acts need not be performed in the order or combinations described herein, and may be performed in any combination of one or more acts.

What is claimed is:

1. An electronic device comprising:
   a processor;
   memory coupled to the processor;
   a root clock coupled to the processor and configured to provide a first timing signal to the processor and the memory;
   an external clock coupled to the processor, the memory, or both; and
   a deep idle mode module, stored in the memory and configured to execute on the processor to:
   determine that the electronic device is idle;
   at least partly in response to determining that the electronic device is idle:
   scale down the root clock from a first frequency to a second frequency, wherein the second frequency is greater than zero;
   in response to determining that the root clock has been scaled down to the second frequency that is greater than zero, switch at least one of the processor or the memory from the root clock to receive a second timing signal from the external clock; and
   after the switching from the root clock, gate the root clock.

2. The electronic device of claim 1, wherein the root clock comprises a microcontroller unit phase-locked loop (MPLL) clock.

3. The electronic device of claim 1, further comprising a general purpose timer (GPT), wherein the deep idle mode module is further configured to execute on the processor to switch the GPT to the external clock to receive the second timing signal at least partly in response to determining that the electronic device is idle.

4. The electronic device of claim 1, wherein the external clock comprises a low frequency clock having a frequency of less than one (1) MHz.

5. The electronic device of claim 1, further comprising a memory clock, and wherein the deep idle mode module is further executable on the processor to scale the memory clock from a first memory clock frequency to a second memory clock frequency prior to the gating of the root clock.

6. The electronic device of claim 1, further comprising a general purpose timer (GPT) having a clock source, wherein the deep idle mode module is further configured to execute on the processor to:
    switch the clock source of the GPT to the external clock at least partly in response to determining that the root clock has been scaled down to the second frequency that is greater than zero; and
    recalibrate a timer frequency of the GPT at least in part due to switching of the clock source of the GPT to the external clock.

7. The electronic device of claim 1, wherein the determining that the electronic device is idle comprises:
    determining a number of timer interrupts received by the processor in a specified period; and
    when the number of timer interrupts received by the processor in the specified period is below a pre-determined threshold, designating the electronic device as idle.

8. The electronic device of claim 1, wherein the determining that the electronic device is idle comprises:
    setting a sample period;
    counting a number of consecutive sample periods during which a specified clock of the electronic device is at or below a specified clock rate; and
    when the number of consecutive sample periods exceeds a pre-determined threshold, determining that the electronic device is idle.

9. The electronic device of claim 1, wherein the deep idle mode module is further configured to execute on the processor to:
    after the gating of the root clock, receive a wake-up event on the processor;
    disable interrupts on the processor;
    enable the root clock;
    propagate a clock value corresponding to a frequency of the root clock down a clock tree of the electronic device; and
    enable the interrupts on the processor.

10. The electronic device of claim 1, wherein the deep idle mode module is further configured to execute on the processor to:
    prior to the gating of the root clock, propagate a clock value associated with the second frequency of the root clock that is greater than zero along a clock tree of the electronic device, wherein the clock tree comprises the root clock and at least one of:
        a processor clock of the electronic device;
        a memory clock of the electronic device; or
        a general purpose timer of the electronic device wherein the root clock is gated in response to determining that the clock value associated with the second frequency of the root clock that is greater than zero has been propagated along the clock tree of the electronic device.

11. An electronic device comprising:
    a processor;
    memory coupled to the processor;
    a root clock to provide a first timing signal to at least the memory;
    a memory clock;
    an external clock; and
    a module maintained in the memory which, when executed by the processor, causes the processor to perform operations including:
        in response to determining that the root clock has been scaled down from a first frequency to a second frequency that is greater than zero, switching at least the memory from receiving the first timing signal from the root clock to receiving a second timing signal from the external clock;
        scaling down the memory clock from a first memory clock frequency to a second memory clock frequency; and
        after the scaling down of the memory clock, gating the root clock.

12. The electronic device of claim 11, the operations further comprising:
    determining a number of timer interrupts received by the processor in a specified period; and
    in response to determining that the number of timer interrupts received by the processor in the specified period is below a pre-determined threshold, performing the scaling down of the root clock, the switching from the root clock, the scaling down of the memory clock, and the gating of the root clock.

13. The electronic device of claim 11, the operations further comprising:
    setting a sample period;
    counting a number of consecutive sample periods during which a specified clock of the electronic device is at or below a specified clock rate; and
    in response to determining that the number of consecutive sample periods exceeds a pre-determined threshold, performing the scaling down of the root clock, the switching from the root clock, the scaling down of the memory clock, and the gating of the root clock.

14. The electronic device of claim 11, further comprising a general purpose timer (GPT), the operations further comprising:
    prior to the scaling down of the memory clock, switching the GPT to the external clock to receive the second timing signal from the external clock; and
    recalibrating a timer frequency of the GPT at least in part due to the switching of the GPT to receive the second timing signal from the external clock.

15. A method comprising:
    under control of a processor of an electronic device specifically configured with executable instructions,
    sending a first timing signal from a root clock to at least one of the processor or a memory;
    determining that the electronic device is idle;
    at least partly in response to the determining that the electronic device is idle:
        disabling interrupts received within the electronic device;

after the disabling of the interrupts, scaling down the root clock from a first frequency to a second frequency, wherein the second frequency is greater than zero;

in response to determining that the root clock has been scaled down to the second frequency that is greater than zero, switching the processor, the memory, or both from receiving the first timing signal from the root clock to receiving a second timing signal from an external clock; and gating the root clock.

16. The method of claim 15, further comprising, prior to the gating of the root clock:

gating core clocks of the electronic device or confirming that the core clocks are gated; and propagating a value associated with the second frequency of the root clock that is greater than zero down a clock tree of the electronic device, wherein the root clock is gated in response to determining that the value associated with the second frequency of the root clock that is greater than zero has been propagated down the clock tree of the electronic device.

17. The method of claim 15, further comprising:

enabling the external clock of the electronic device;

switching a general purpose timer (GPT) to the external clock;

recalibrating a timer frequency of the GPT;

scaling a memory clock of the electronic device;

disabling processor clock scaling;

performing the switching of the processor to the external clock;

performing the switching of the memory to the external clock;

propagating clock values associated with the second timing signal of the external clock throughout a clock tree of the electronic device;

enabling the interrupts received within the electronic device after the gating of the root clock; and enabling the processor clock scaling after the enabling of the interrupts.

18. The method of claim 15, further comprising, after the gating of the root clock:

receiving a wake-up event on the processor;

disabling interrupts on the processor;

enabling the root clock;

propagating a clock value corresponding to a frequency of the root clock down a clock tree of the electronic device; and enabling the interrupts on the processor.

19. The method of claim 15, further comprising:

enabling the interrupts received within the electronic device after the gating of the root clock; and after the enabling of the interrupts, scaling down a processor clock of the electronic device.

20. One or more computer-readable storage media storing instructions that, when executed by a processor of an electronic device, cause the processor to perform operations comprising:

determining that the electronic device is idle; and at least partly in response to the determining that the electronic device is idle:

scaling down a root clock from a first frequency to a second frequency, wherein the second frequency is greater than zero; and in response to determining that the root clock has been scaled down to the second frequency that is greater than zero, switching at least one of the processor or the memory from receiving a first timing signal from the root clock to receiving a second timing signal from an external clock.

21. The one or more computer-readable storage media of claim 20, the operations further comprising gating the root clock after the switching from the root clock.

22. The one or more computer-readable storage media of claim 20, the operations further comprising:

propagating a value associated with the second frequency of the root clock that is greater than zero down a clock tree of the electronic device, wherein the clock tree comprises the root clock and at least one of:

a processor clock of the electronic device;

a memory clock of the electronic device; or a general purpose timer of the electronic device; and gating the root clock in response to determining that the value associated with the second frequency of the root clock that is greater than zero has been propagated down the clock tree of the electronic device.

23. The one or more computer-readable storage media of claim 20, wherein:

the electronic device includes an electronic book reader device; and the electronic book reader device is determined to be idle at least in part based on a system event that is generated in response to detecting that a user has turned a page of an electronic book.

* * * * *